United States Patent [19]

Basso et al.

[11] Patent Number: 5,491,815
[45] Date of Patent: Feb. 13, 1996

[54] METHOD AND DEVICE FOR CONTROLLING TIMERS ASSOCIATED WITH MULTIPLE USERS IN A DATA PROCESSING SYSTEM

[75] Inventors: Claude Basso, Nice; Jean Calvignac, La Gaude; Tan T. Pham, Antibes; Charles Rheinart, Tourrettes/Loup, all of France

[73] Assignee: International Business Machines Corporation, Armonk, N.Y.

[21] Appl. No.: 120,112

[22] Filed: Sep. 10, 1993

[30] Foreign Application Priority Data

Sep. 11, 1992 [EP] European Pat. Off. .............. 92480130

[51] Int. Cl.$^6$ ...................................................... G06F 1/04
[52] U.S. Cl. .................... 395/550; 364/270; 364/270.2; 364/270.3; 364/DIG. 1
[58] Field of Search ............................ 395/550; 364/270, 364/270.2, 270.3

[56] References Cited

U.S. PATENT DOCUMENTS

| 4,393,446 | 7/1983 | Gurr et al. ................................ 395/550 |
| 5,042,002 | 8/1991 | Zink et al. ................................ 364/900 |
| 5,265,004 | 11/1993 | Schultz et al. ........................... 364/140 |

FOREIGN PATENT DOCUMENTS

| 0355243 | 2/1990 | European Pat. Off. ........ G04G 15/00 |

OTHER PUBLICATIONS

IBM Technical Disclosure Bulletin, vol. 33, No. 12, May 1991, Armonk, N.Y., pp. 206–207, "Binary–Weighted Delay Function".
IBM Technical Disclosure Bulletin, vol. 32, No. 6B, Nov. 1989, Armonk, N.Y., pp. 266–270, "Mechanism for a Wrap-around Time–ordered List with a Variable Real–time List Origin".
Proceedings of the 1988 International Zurich Seminar on Digital Communications, Mar. 8, 1988, pp. 93–98, "Timers in OSI Protocols—Specification versus Implementation" by E. Mumprecht et al.

Primary Examiner—Kevin A. Kriess
Assistant Examiner—Dennis M. Butler
Attorney, Agent, or Firm—Edward H. Duffield; John J. Timar

[57] ABSTRACT

A system for providing a plurality of timers to perform the timing of event occurrences wherein, for each event, there corresponds a timer control block which stores in its time-flag field (Tf) an indication of whether the timer control block is chained or unchained, running or stopped, in its time-out field (Tv) the expiration time interval and in its time-stamp field (Ts) the current time as a reference at each interruption. The timer control blocks are chained by a one-way link according to their expiration times in such a way that each timer chain contains the timer control blocks whose events will occur at the same time. A cyclic table of index values classifies the timer chains according to their expiration times. When a START operation is requested for an event which has to occur at a time-out value, an index is computed according to the Tv and the current time in order to insert its corresponding timer control block at the head of the timer chain pointed to by the index; the timer control block storing the state of CHAINED-RUNNING in its time-flag and the current time in its time-stamp. If the timer control block is already chained, then the time-stamp is updated to the current time and the time-flag to RUNNING. Whenever a RESTART operation is requested for an event which has not occurred, the time-stamp of the corresponding timer control block is updated to the value of the current time. Whenever a STOP operation is requested before the event has occurred, the time-flag is updated to STOP. The time-stamps and the time-flags are updated according to the START, STOP and RESTART operations, the current index of the cyclic table is incremented at each timer-tick to delete the timer control blocks of the chain whose events have occurred or whose time-out values have expired, and to insert new timer control blocks in the new timer chain for those tasks which have been interrupted and whose events have not occurred yet.

5 Claims, 9 Drawing Sheets

FIG. 4-A
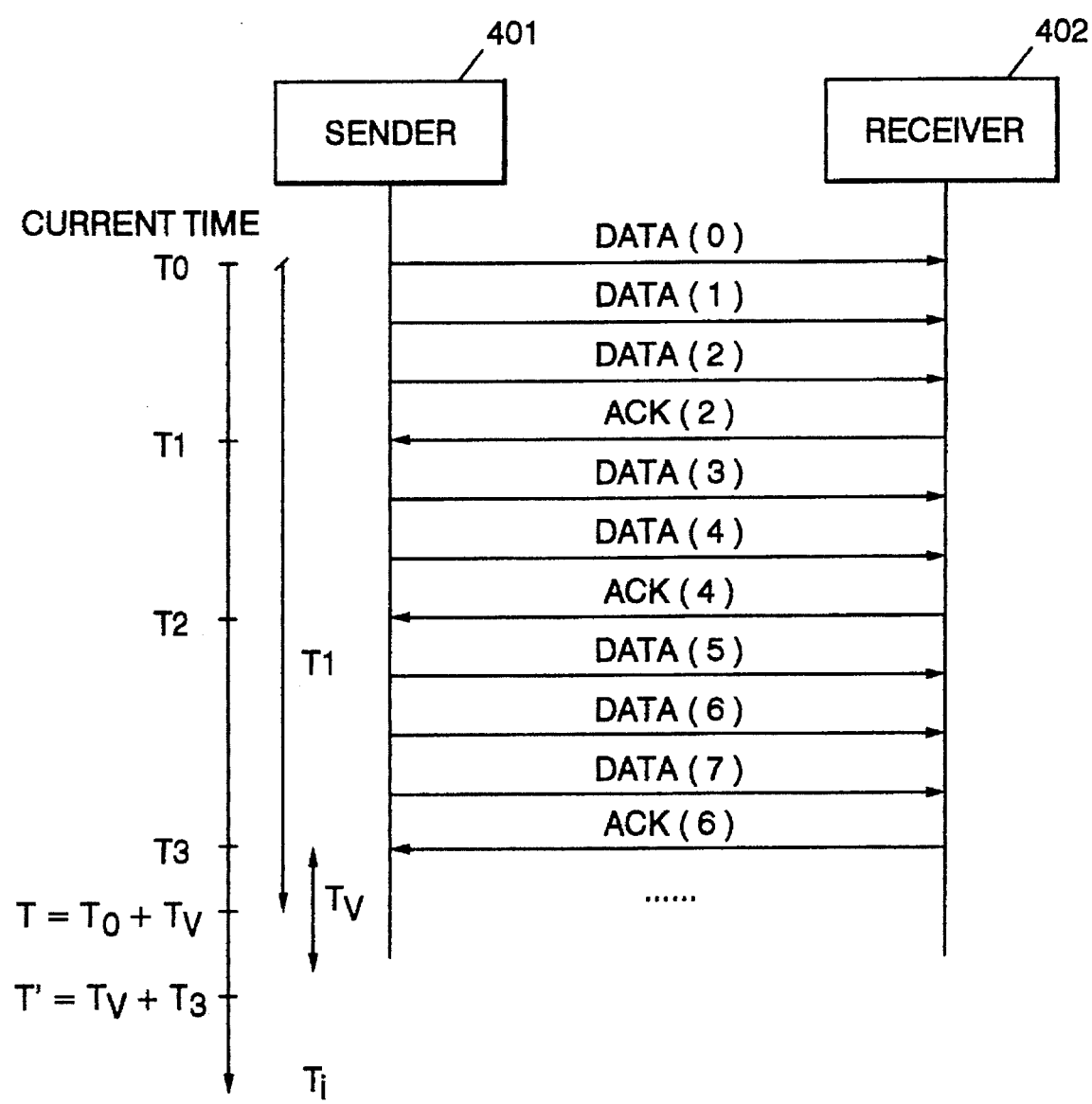

FIG. 4-B
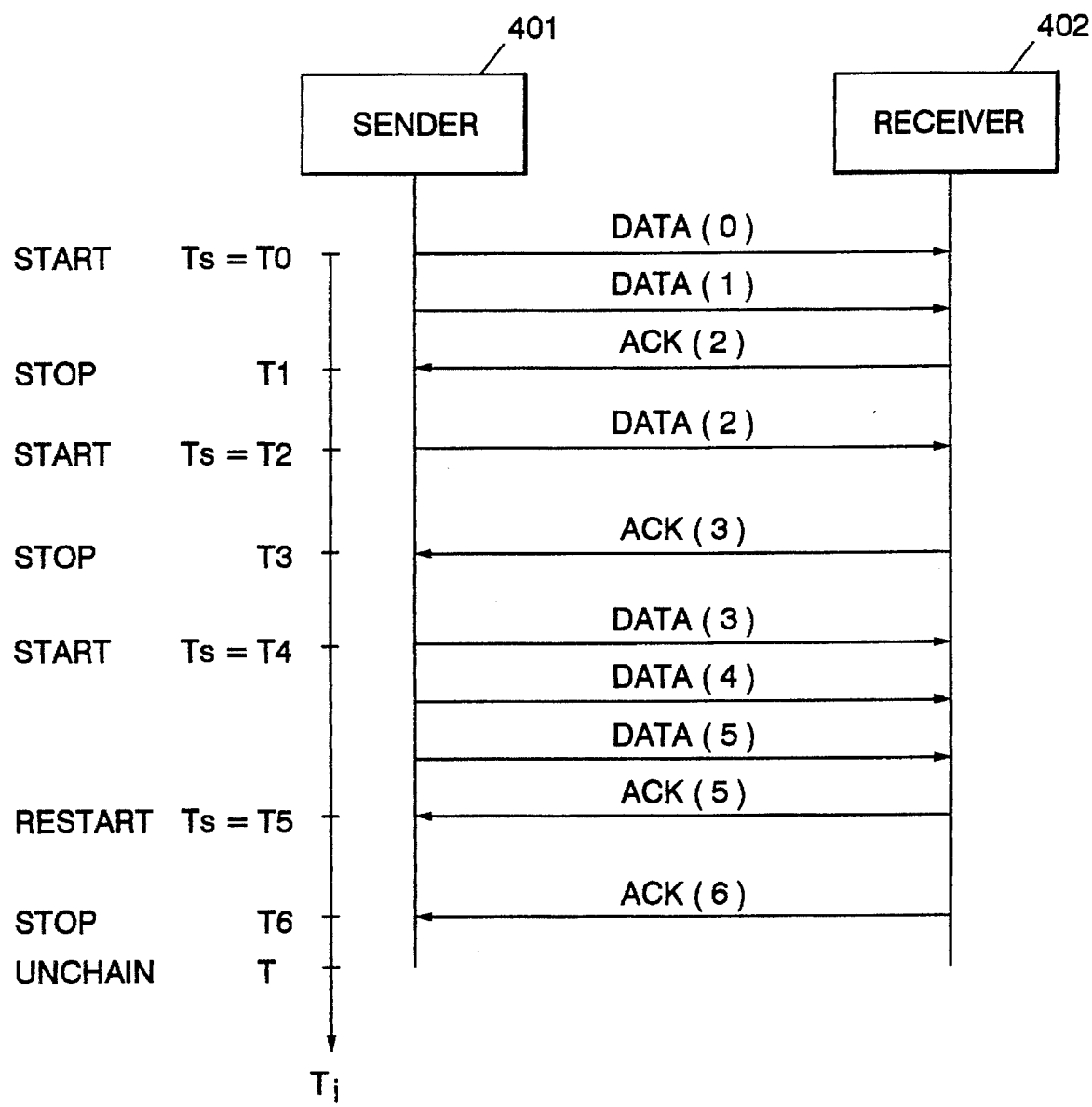

METHOD AND DEVICE FOR CONTROLLING TIMERS ASSOCIATED WITH MULTIPLE USERS IN A DATA PROCESSING SYSTEM

FIELD OF THE INVENTION

The present invention relates to a method and a device implemented in a data processing systems wherein a plurality of users need to watch whether events occur before time-out delays elapse. More particularly, it relates to a method and a device to be implemented in a communication system wherein users exchange messages for notifying the users that predetermined time-out delays assigned to events have elapsed.

BACKGROUND ART

A timer is a device which can be set to furnish an interrupt or a timeout indication at a specific time instant or after a selected time interval. Timers are required in communication systems in which typical protocols require that a very large number of simultaneously occurring tasks or events be supervised to detect whether they occurred within predetermined delays. A START operation is sent by the user to start the timer in order to supervise a corresponding event. When the supervision of an event has to be interrupted for different reasons, a STOP operation is generated by the corresponding user. After a while, the supervision of the corresponding event may be requested to start once again, then a START operation is generated by the user. While the timer associated with an event is still running, the user may request a RESTART operation in order to delay the timing of the corresponding event.

In communication systems, because the transmission time of messages between users is very short, thousands of START, RESTART and STOP operations are generated at nearly the same time by the users for supervising many events. In that environment, these operations need to be performed very efficiently in order not to impair the performance of the communication systems.

Timer arrangements generally comprise a timer control block (TCB) associated with each event where time-out delay is to be controlled. These TCBs are managed (i.e. chained, updated or removed from a chain) under control of a program. FIG. 1-A represents a simple chained structure of TCBs which are doubly linked in order to make easier the deletions and insertions of TCBs in the TCB chain. Each new TCB is simply added to the end of the chain in response to a START operation and the timer which has to be deleted in response to a STOP operation is easily removed from the chain thanks to the double links. This simple structure is not adapted to control a large number of outstanding events because, at every time increment (timer-tick), it is necessary to scan the entire chain to detect if the time-out delay of any event has elapsed.

This scan on each timer tick can be avoided by chaining the TCBs in the order in which the corresponding events are awaited. FIG. 1-B shows the implementation of an ordered list TCB chain structure whose performance is better than that of the chain structure of FIG. 1-A. In the subject mechanism, a new TCB is inserted in the correct point of the chain. This operation is facilitated by the fact that the TCBs are doubly linked. However, this is done at the cost of introducing a chain scan every time the supervision of a new event is needed. This implementation is possible when the system does not require several thousands of timer control blocks.

The EP application A1 355 243 discloses a timer device which enables, in a multiple timer arrangement, simple setting and cancelling of timers. In it, each timer has a corresponding timeout value and a timer tag. A specific time scale register and a clock divider are provided so that the resolution of the timer is easily selectable. To allow existence of several timers expiring at the same time, a special timer service with chainable timer control block is provided in order to delete all of a chain of timers which expire at the same time. A drawback of this device is that it is not adapted to an environment where the START, RESTART and STOP operations may occur one after the other, almost simultaneously and before the timeout occurs. This complicates the updating of the time-out which has to be added to the current contents of the cyclic counter to generate a new address, at which the timer tag is stored, thus establishing a new timer.

OBJECTS OF THE INVENTION

An object of the invention is to provide an improved method and a device for supervising a large number of events in a data processing system in a very efficient and simple way using a large number of timers.

It is another object of the invention to provide an improved method and a device which associate with each timer a timer control block, and wherein all timer control blocks are managed in order to improve the START, RESTART and STOP operations of the timers.

BRIEF SUMMARY OF THE INVENTION

These objects are achieved by a method for controlling a plurality of timers of different users, each timer being associated with an event and a timer control block in a data processing system. In this system, a user issues a START operation of a timer when the occurrence time of the corresponding event is awaited within a time-out period (Tv), a RESTART operation when the occurrence time of an event has to be delayed, and a STOP operation when the event has occurred. This method is characterized in that:

each timer control block is divided into at least a time-flag field, a time-stamp field and a time-out value field and in that it comprises the steps of:

providing a cyclic means having a number N of storing locations which are sequentially addressed by an addressing means at regular time intervals (timer-tick), in response to a START operation issued by a user computing, according to the current time and the time-out value of said event, an address of a storing location in said cyclic table, inserting said timer control block in a chain of timer control blocks associated with events which expire at the same time, said chain being pointed to by a control block address stored at the computed address in the cyclic table, updating and storing in the timer control block, the flag-state of the time-flag field to the state of "RUNNING" to indicate that the timer is active and the flag-chain of the time-flag field to the state of "CHAINED" if the timer control block is inserted for the first time in the chain, and if the timer control block is already chained then the flag-state is simply updated to the state of "RUNNING", storing the time-out value in the timer control block of the corresponding event, updating and storing, in the timer control block, the time-stamp field to the current time, in response to a STOP operation updating the flag-state in the time-flag field of the associated timer control block to the state of "STOP", at each regular time interval (timer-tick), successively reading each timer control block chained to the addressed location of the cyclic means, and checking the state of the time-flag field and unchaining the timer control block if its flag-state is STOP otherwise, computing the new time-out according to the current time, the time-stamp and the last time-out (new time-out=time-out+ time-stamp−time-current) to control if the time-out delay has elapsed and inserting the timer control block to a new timer control block chain if the value of the new time-out is positive, or unchaining and stopping the timer control block if said timer control block is equal to 0 and notifying the user that the time-out delay has elapsed.

Said method is implemented in a device which comprises:

a cyclic means having a number N of storing locations which are sequentially addressed by an addressing means at regular time intervals (timer-tick) in order to classify the different timer control blocks of the corresponding events according to their time-out values and the current time, and a timer chain which is pointed to by said addressing means and to which are chained a plurality of timer control blocks associated with events which should occur at the same time before said START, RESTART or STOP operations interrupt the timing of said events.

BRIEF DESCRIPTION OF THE DRAWINGS

FIG. 4-A shows an example of a RESTART operation flow.

FIG. 4-B shows an example of STOP operations followed by START operations flow.

DETAILED DESCRIPTION OF THE PREFERRED EMBODIMENT OF THE INVENTION

Figure 1A:
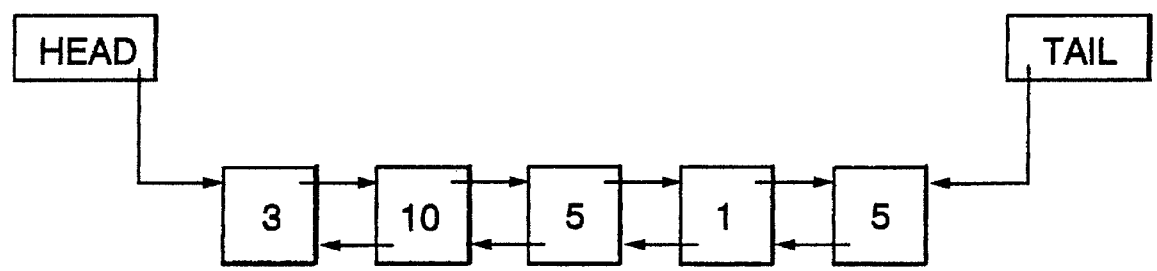
FIGS. 1-A and 1-B represent the evolution of the timers in the prior art, from a simple timer chain structure to an ordered list timer chain structure.
Figure 1B:
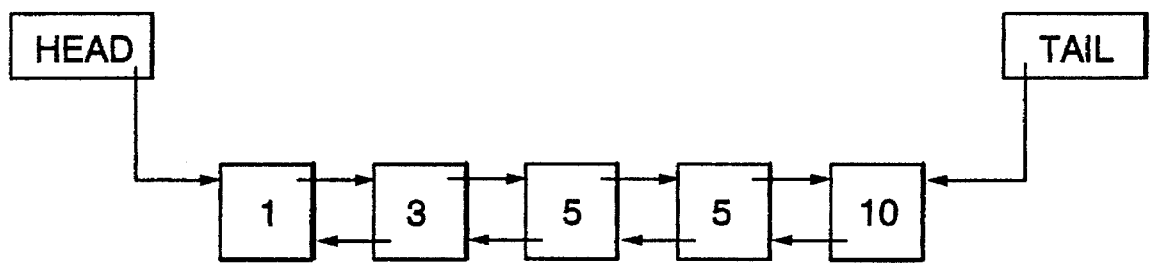
Figure 2:
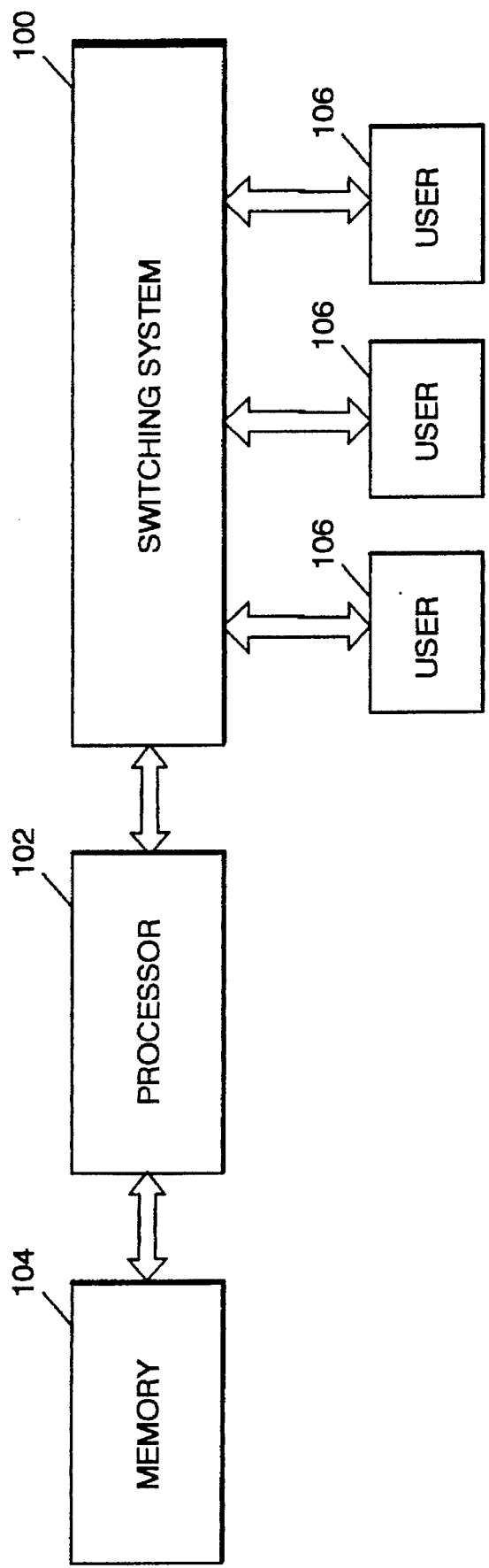
FIG. 2 shows the environment of the preferred implementation of the present invention.

FIG. 2 shows an environment wherein the present invention may be implemented. It comprises a switching system 100 which enables connecting a plurality of users 106. A processor 102 controls the exchange of messages between the users and, according to the subject invention, manages the timer arrangement. A memory 104 contains the communication control program and also the data structure of the timer control blocks. Each user has its own timer control block in the memory, where it is identified by an address. The timer control program which enables management of the timer control blocks according to the START, RESTART and STOP operations is also stored in the memory and is controlled by the processor.

Figure 3:
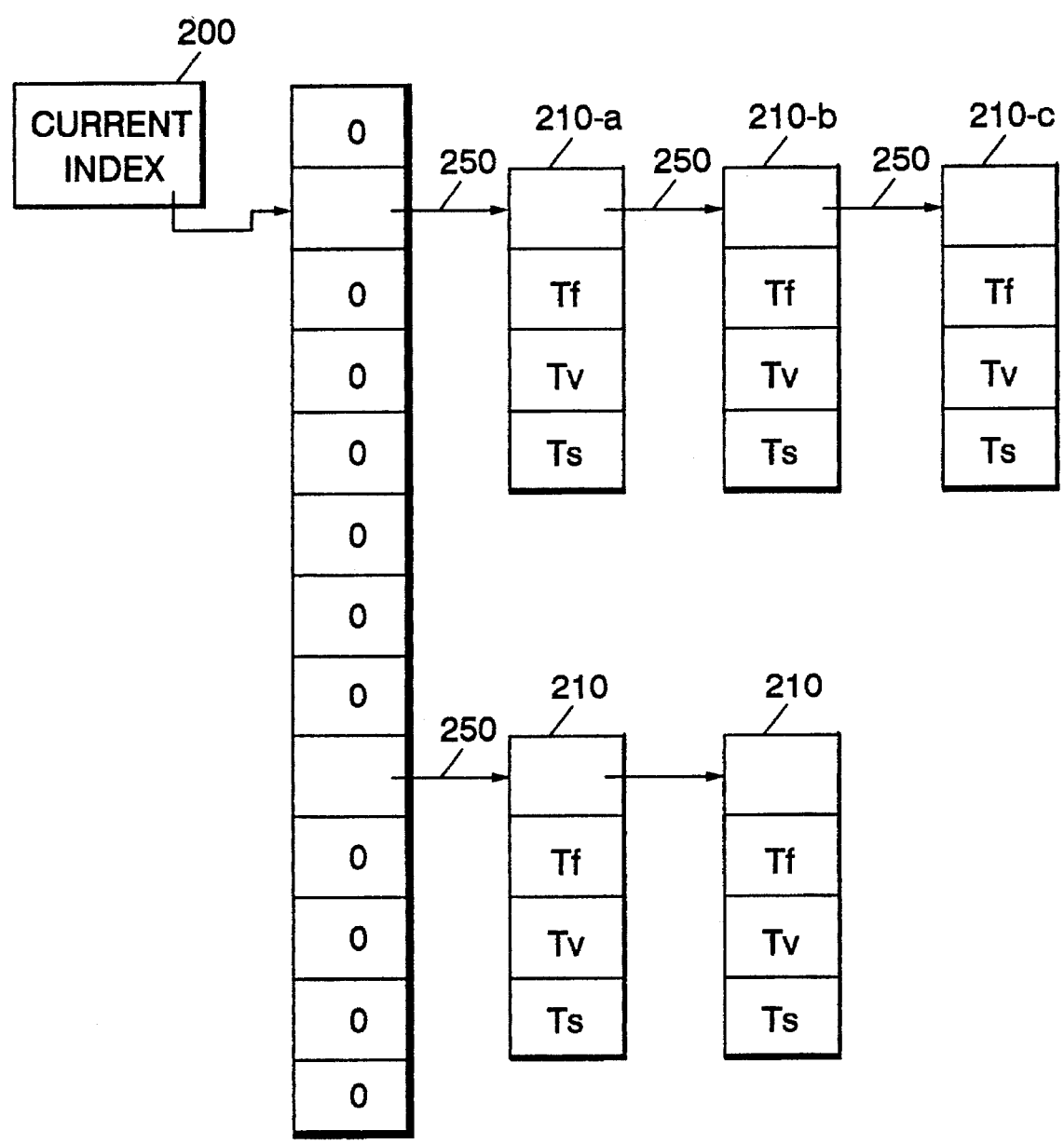
FIG. 3 shows the timer chain structure of the present invention.

In order to understand FIG. 3, one must have in mind the three following notions:

The current time is indicated by the value of the incrementation of the timer tick. This variable is reset to 0 at the initialization time.

The current index indicates the position of the index in the cyclic table corresponding to the current time. It is incremented at each timer tick. When the index reaches the end of the table, it is reset to 0.

The current chain indicates the set of timer control blocks specified by the current index.

FIG. 3 shows the timer chain structure of the present invention. It comprises a cyclic table 202 having a given number of storing locations addressed by a unique current index 200. This current index is incremented at regular time interval called timer-ticks to specify the corresponding storing location which stores the address of a timer control block to be chained to the cyclic table. Timer control blocks 210-a, 210-b, 210-c may be chained in one-way link 250 to the cyclic table as will be described later on, by storing the address of the next timer control block in the previous TCB if there is one. Otherwise a special code is used, for example 0, to indicate that it is the last block of the timer chain. The current index is used when adding a TCB to the timer chains—the chain number or the index of the cyclic table to which the timer block has to be added is relative to the current chain, not to the first chain. On each timer tick, the current index is incremented, and the chain specified by the new index is now the current chain.

In addition to the conventional address fields in the TCB used for chaining purposes, the TCB comprises specific fields, as follows:

Data Structure

The time-flag field (Tf) indicates the status of a timer control block associated will an event. It comprises two time flags:

The flag-chain: having two values CHAINED or UNCHAINED to indicate whether the timer control block is in a chain or not, The flag-state: having two values STOP or RUNNING to indicate whether the timer is active or not.

The time-value field (Tv) indicates the time-out values of the associated event. Its range varies from 1 second to 10 seconds. By time-out it is meant the time duration after which a user should be notified that an awaited event has not occurred.

The time-stamp field (Ts) indicates when the last START or RESTART operation is performed.

The three values Tf, Tv and Ts are stored in the timer control blocks.

To each timer control block there corresponds an event which requires three kinds of information which are: the time-flags, the time-value and the time-stamp whose values are updated according to the START, RESTART or STOP operations.

There are two categories of operations which are performed for the management of the timer control blocks: the operations of START, RESTART and STOP that are requested by the users in order to chain, unchain or update the timer control blocks, and the operation which is performed at regular time interval (at every timer-tick) which enables checking if the events whose timer control blocks are chained to that timer chain have occurred or not in order to cancel the whole chain and to chain the new timer control blocks whose events have not occurred to a new timer chain.

Start, Stop and Restart Operations

The START operation is used in the present implementation to add the timer control block associated with an event into a timer chain whose events are initially assumed to occur before the same time. It is performed as follows:

If the timer control block is not chained, it is added to a new timer chain. Its time-flag field (flag-chain and flag-state) is updated to the state of CHAINED_RUNNING and its time-stamp field (Ts) is updated with the current time.

If the timer control block is already chained, then its flag-state is updated to the state of RUNNING and its time-stamp field Ts is updated with the current time.

The STOP operation does not immediately remove the timer control block from the chain. It only specifies the state of the timer. The timer control blocks will be removed once all the events have already occurred and once the timer control block, which has been updated according to the interruptions of the process while it was running, has expired. This allows ending of unnecessary removal and addition of timer control blocks from/into the chains and improves the timer control block management.

The STOP operation simply updates the flag-state of the specified timer control block to STOP and keeps it on the timer chain.

The RESTART operation does not remove the associated timer control block from the timer chain and set up a new timer event by chaining it on a new chain. It only updates the timer control block according to the current time as long as the RESTART operation occurs before the STOP operation.

The RESTART operation simply updates the time-stamp to the current time.

Fast Restart Operation

As it is useless to unchain the timer control block and chain it again when the RESTART operation is invoked before the current index reaches the position of the chain number to which said timer control block is chained, several fast RESTART operations are provided for the duration of the time-out value. The present implementation requires only one manipulation of the timer control block for the duration of the time-out value, as compared to one manipulation at each RESTART operation in other implementations.

It must be acknowledged that this implementation is particularly adapted to an environment where the users exchange information frames and where the transmission time of each frame is around 1 micro-second. Where 1000 frames are to be sent per second, this leads to 1000 restart operations.

It should be noticed that a START operation on an already active timer is implemented as an implicit RESTART operation.

The timer flags are widely used in the START, STOP and RESTART operations to handle correctly the state of the timer and to reduce its manipulation (add to the timer chain, remove from the timer chain). When a timer control block is not chained, this implies the timer is non-active. But a non-active timer control block does not imply that the timer control block is unchained. Therefore, the relationship among the states CHAINED/UNCHAINED and STOP/RUNNING are as follows:
UNCHAINED implies STOP; RUNNING implies CHAINED.

And the correct combinations of these states in a timer control block are: UNCHAINED-STOP, CHAINED-STOP and CHAINED-RUNNING.

Operations Related to the Current Chain
(Timer-Tick)

One TCB chain which is the current chain, is processed at each timer tick, and the chain becomes empty after this process. All TCBs on the current chain are processed as follows:

The timer control blocks which are marked STOP are simply removed from the timer chain.

The timer control blocks which are marked RUNNING and where the condition (current-time<time-stamp+ time-value) is true are added to a new chain. The index of the new chain is specified by the remaining duration: (time-stamp+time-value−current time).

The timer control blocks which are marked RUNNING and where the above described condition is false, are removed from the chain and the users supervising the corresponding events are notified that the time-out delays of the events have expired.

High Capacity and Efficient Timer Support

Each active timer has a time-out value which is translated by the timer control program to an index associated with the cyclic table 202. The index gives the chain number to which the timer control block has to be inserted. Each new timer control block is simply added to the head of the chain. This insertion is easy to perform thanks to the one-way link of the chain. Since the timer control block is always inserted to the head of the chain and since all the timer control blocks of a chain are deleted at the same time, it is not necessary to implement a doubly linked structure which operates slower than a one-way link.

It can be seen that no scan is required for any of these timer control blocks, either for addition or for cancellation of a timer control block, or when the timer tick occurs. The cost of adding, cancelling and notifying the user is approximately constant, regardless of the number of outstanding timer events. The number of timers is configured according to the memory space allocated to the timer control blocks.

FIG. 4-A shows an example of a RESTART operation flow between a sender 401 connected to its own timer and a receiver 402 also connected to its own timer. But in this example, we will only consider what happens on the sender side.

A sender 401 issued a START operation at T0 with a time-out value (Tv) when it sends a data (0) of a message to a receiver 402. The time-flags and the time-stamp are updated respectively to CHAINED-RUNNING and to the current time, Ts=T0. The associated TCB is added in the chain of TCBs which correspond to events which will occur before time T, where T=T0+Tv. At T1, the receiver sends a partial acknowledgement (2) for the reception of the data (0) and the data (1) whereas the sender has already sent the data (2), then the timer is restarted, not stopped because the data (2) have not been acknowledged by the receiver. As it is a RESTART operation, the time-stamp is updated with the current time, Ts is set equal to T1 in the control block.

In this example, the timer is restarted each time the sender receives an acknowledgement because the last data sent have not been acknowledged yet, and the time-stamp is updated with the current time which is successively T2 and T3.

When the current time is equal to T (at time T), the timer control block is removed from the TCB chain and is added in the chain of TCBs corresponding to events will occur at time T'=Tv+T3, and the time-stamp is left unchanged Ts=T3.

Efficient Start/Stop Operation

When the sender issues a STOP operation, the timer control block is kept on the chain. This provides an opportunity to support efficiently multiple START and STOP sequences as is illustrated in FIG. 4.

FIG. 4-B shows an example of STOP operations followed by START operations between a sender 401 and a receiver 402 which are combined with RESTART operations.

In response to the START operation received by the processor, the timer control program code starts the supervision of the timer control block corresponding to the event at T0 with a time-value (Tv) when the user sends a data (0) of a message. The time-flag and the time-stamp are updated respectively to CHAINED-RUNNING and to the current time, Ts=T0. The associated timer is added in the chain of TCB associated with events which are assumed to occur before the time T, where T=T0+Tv. At T1, the user receives a complete acknowledgement (2) for the reception of the data (0) and the data (1), it sends a STOP operation and the flag-state is updated to STOP. Another message may be required to be sent out at T2 and the user has to send a START operation again, therefore, the flag-state and the time-stamp are respectively updated to RUNNING and to the current time Ts=T2.

At time T5, when the user receives a partial acknowledgement, a RESTART operation is sent as it has been seen in the example of FIG. 3.

When the current time is equal to T (at time T), the timer control block having the expiration time T is simply removed from the timer chain.

In this example where partial and complete acknowledgements interleave, the sequences of START, STOP and RESTART operations at time T1 through T6, do not involve the manipulation of the timer control blocks because the time T has not been reached yet, (T=T0+ Tv). This opportunity enables a performance gain as long as the START, STOP and RESTART operations occur almost simultaneously.

The present implementation enables reducing the manipulation of the timer control blocks by delaying the effective deletion of the TCBs which remain chained to the timer chain until the time-out delay has elapsed. Again, this implies only one manipulation of the timer control block, compared to adding and removing the timer control block to/from the timer chain at each START and STOP operation.

Figure 5:
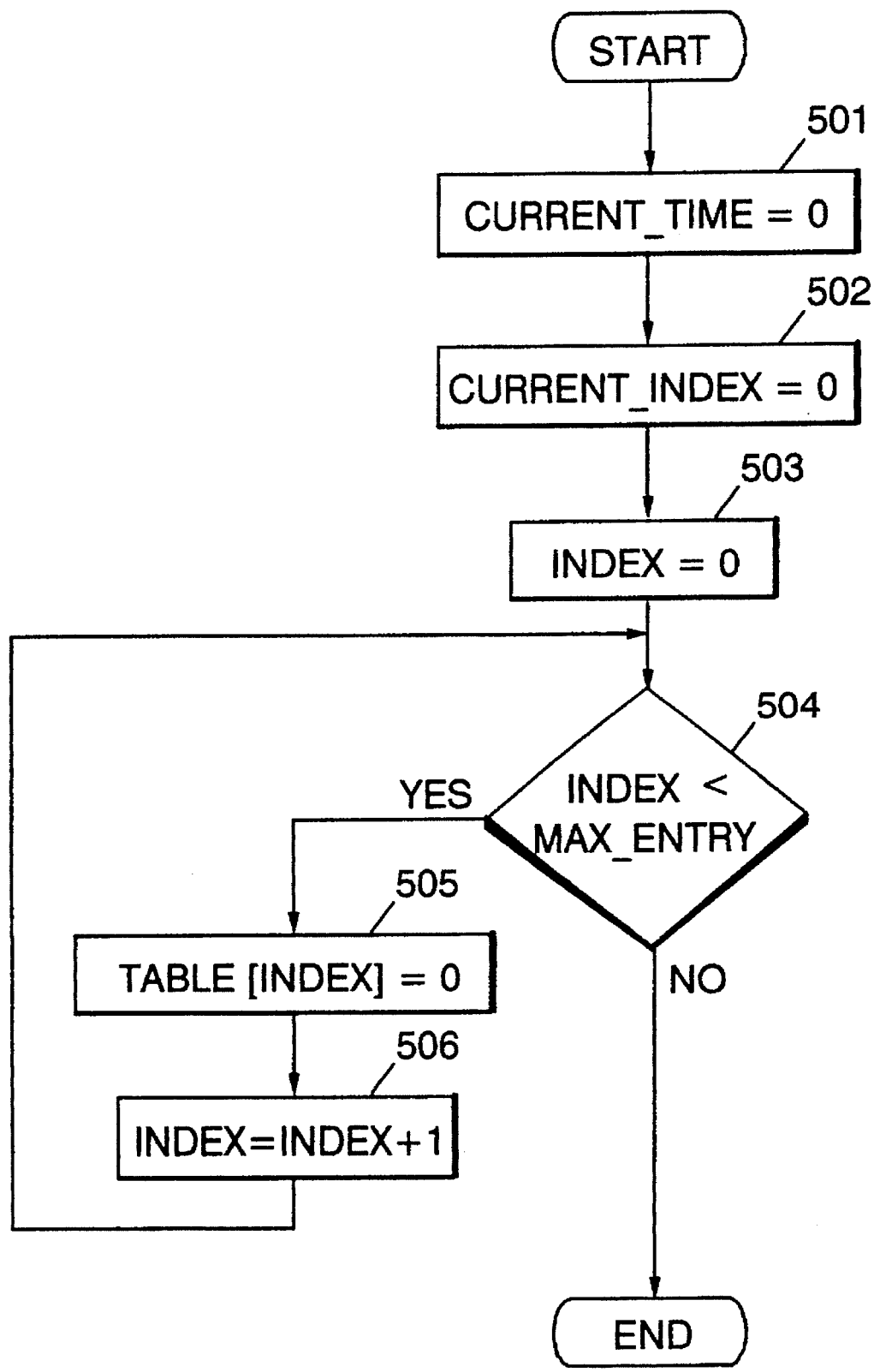
FIG. 5 shows the flow-chart of the INIT operation.

FIG. 5 shows the flow-chart of the initialization operation of the timer control blocks.

The current-time which is an integer to be incremented at each timer-tick during processing is initially reset, at step 501, as is the current-index in order to point to the first storing location of the cyclic table, at step 502. A loop is entered to scan every location of the cyclic table to set the table(index) in each location to 0. The index which is also an integer varying from 0, at step 503, to max-entry, at step 504, enables classification of the storing locations of the cyclic table. The max-entry number corresponds to the size of the cyclic table which may be changed in order to enable taking into account the events whose time-out value are great. Each table(index) corresponding to a storing location is set to 0 in order to indicate that there is no timer control block addressed by said storing location of the cyclic table, at step 505. Then the index is incremented by 1, at step 506.

A table(index) is set to 1 to indicate that a timer control block is chained, and the corresponding storing location will store the address of said timer control block in its memory.

Figure 6:
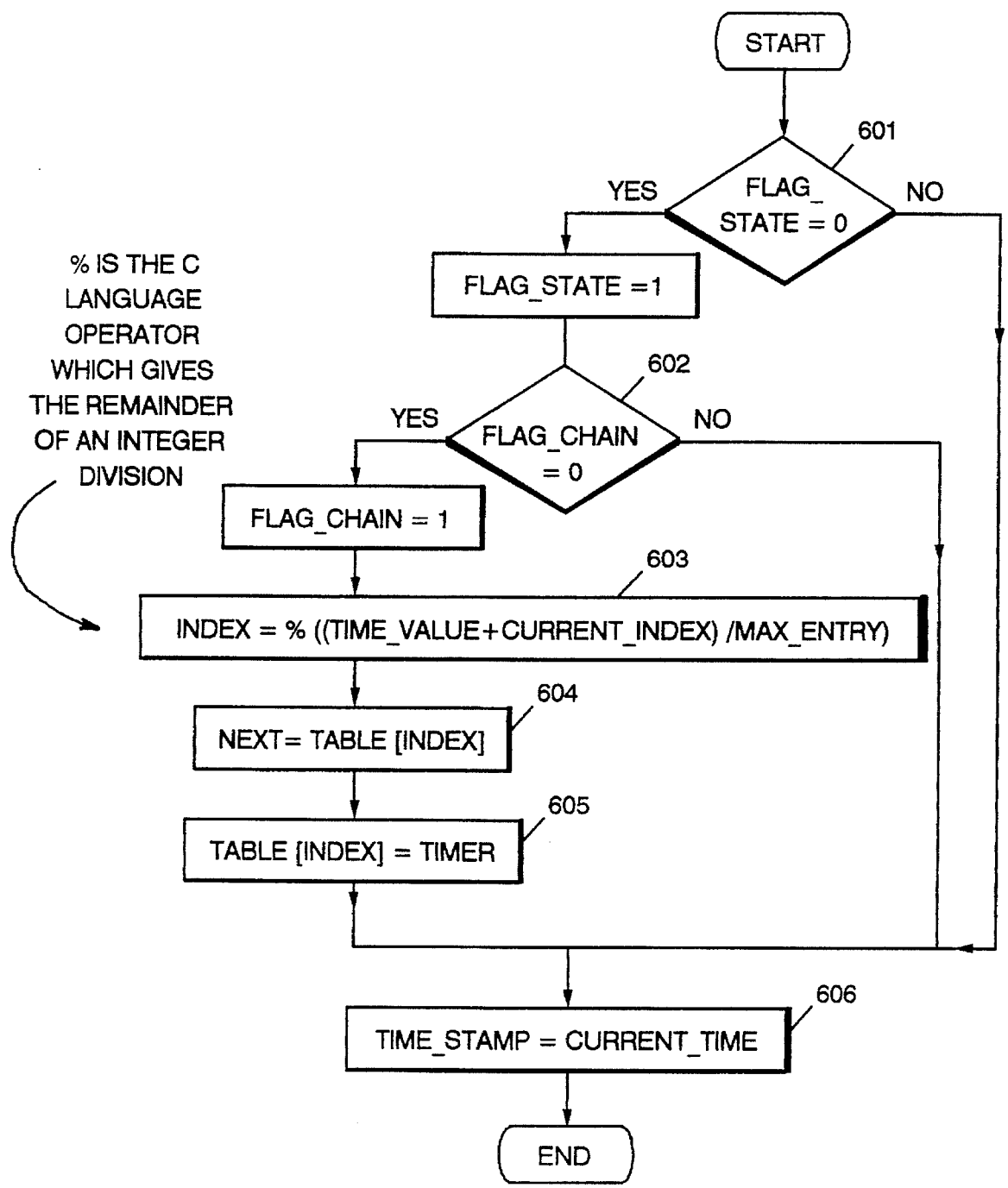
FIG. 6 shows the flow-chart of the START operation.

FIG. 6 shows the flow-chart of the START operation of a timer control block.

At step 601 it is tested if the flag-state is in the state of stop (=0) or running (=1). If the timer control block is not active (flag-state=0), then the flag-chain is tested to check if the TCB is chained to the cyclic table, at step 602. If it is not chained (flag-chain=0), then the value of the index which represents the remainder of the division of (time-out value+ current index) by max-entry is calculated at step 603. At step 604, the TCB is chained to the cyclic table at the position which corresponds to the calculated value of the index by a one-way link. The timer control block is therefore inserted at the head of the corresponding timer chain, at step 605. At step 606, the time-stamp of the timer control block is updated to the value of the current time, before the start operation ends.

If at step 601, the flag-state is found running, then the start operation ends.

If at step 602, the timer control block is chained (flag-chain=1) and stopped as indicated by the test at step 601, the program will loop to step 606 to update the time-stamp to the value of the current time.

A START operation on an already active timer is implemented as an implicit RESTART operation.

The STOP operation consists only in setting the flag-state to STOP and the flag-chain to CHAINED.

The RESTART operation consists only in updating the time-stamp to the current time.

Figure 7A:
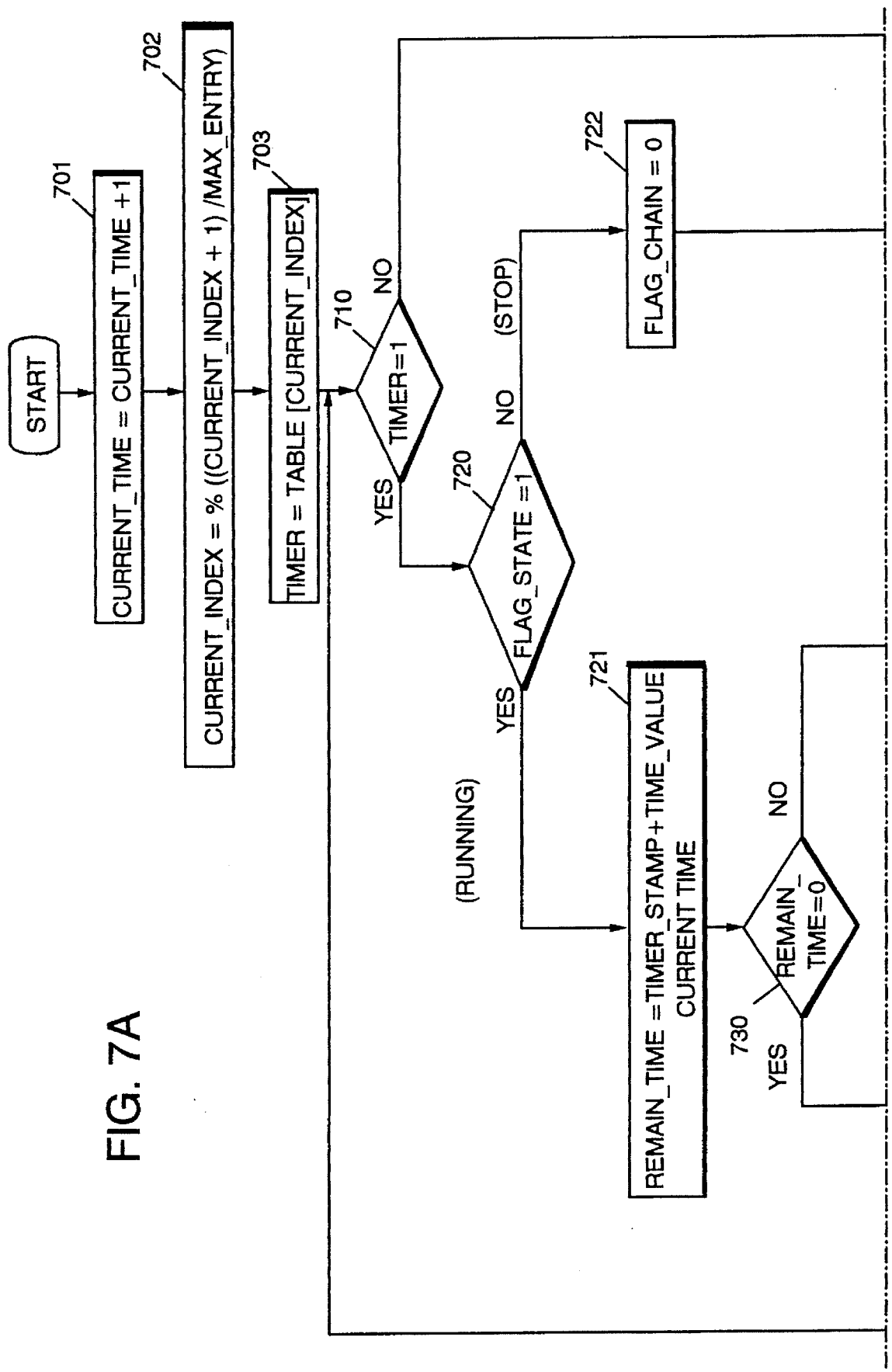
FIG. 7 shows the flow-chart of the Timer-tick operation.
Figures 7, 7B:
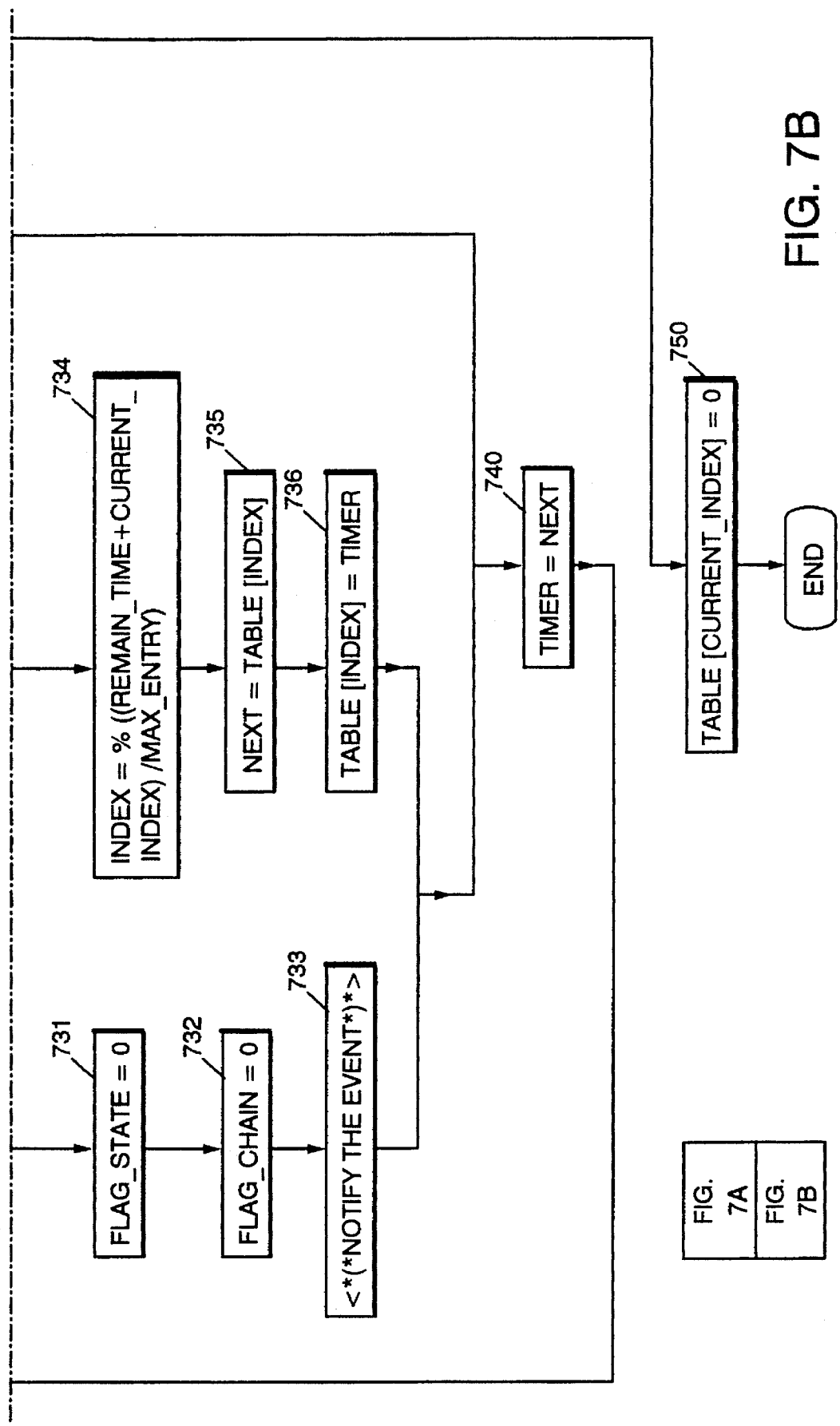

FIG. 7 shows the flow-chart of the timer-tick operation performed at regular time intervals (timer-tick).

At every timer-tick, the current-time is incremented, at step 701, and the current-index is computed as the remainder of the division of (current-index+1) by max-entry, at step 702. The system checks the timer control blocks which are chained to the cyclic table at the corresponding current__ index, at step 703.

At step 710, the first timer control block of the chain is pointed to. If there is a timer control block which attached to the corresponding current-index, at step 720, the system checks if the timer control block is running or stopped according to the state of the flag-state. If it is running, then at step 721, the remain-time is computed (as remain-time= time-stamp+time-out value− current-time).

If the remain-time is equal to zero, at step 730, this means that the time-out delay corresponding to the timer control block has elapsed. Then, at step 731, the flag-state is set to stop, and the flag-chain is also set to unchained, at step 732. The system notifies the corresponding user that the time-out delay has elapsed so that he may take the appropriate recovery procedure, at step 733.

If the remain-time is not equal to zero, at step 730, which means that the event has not occurred yet, the system then computes the new index which has been modified by the value of the time-stamp (index=the remainder of the division of (remain-time+current-index) by max-entry), at step 734. At step 735, the TCB is inserted at the head of the chain which corresponds to the number of the new index. The timer control block stores the new values of the time-flag, time-value, and time-stamp, at step 736.

If, at step 720, the flag-state of the present timer control block indicates that the TCB is stopped, then the system unchains the timer control block from the chain.

Once the first timer control block is checked, after steps 733 or 736 or 722, the system then points to the next timer control block at step 740. The system loops back to step 710 and the processing starts once again if there are still timer control block on the same chain.

Otherwise, at step 750, the system resets the whole chain of timers by cancelling all the timer control blocks of that chain.

The system waits until the next timer-tick in order to treat in the same way the timer control blocks as has been previously described. Meanwhile, all new events to which are associated timer control blocks are inserted at the head of the timer chain which corresponds to the index computed according to the time-value and the current-index.

What is claimed is:

1. A method of controlling a plurality of timers of a number of users, each timer being associated with an event and having an associated timer control block in a data processing system having a processor and a memory wherein a user issues a START operation for a timer when an occurrence time of the associated event is awaited within a time-out period (Tv), a RESTART operation when the occurrence time of the associated event has to be delayed, and a STOP operation when the associated event has occurred, wherein each said timer control block is divided into at least a time-flag field (Tf), a time-stamp field (Ts), a time-out value field (Tv) and an address field, said method comprising the steps of:

addressing a cyclic means having a number N of storing locations which are sequentially addressed by an addressing means at regular time intervals, said cyclic means being managed by a timer control program stored in said memory and controlled by said processor, computing, in response to a START operation issued by a user according to a current time and a value in said time-out value field of said associated event, an address of said storing location in said cyclic means, inserting said timer control block in a chain of timer control blocks associated with events which occur at the same time, said chain of timer control blocks being pointed to by a control block address stored at a computed address of a storing location in said cyclic means, updating a flag-state field of said time-flag field (Tf) in said timer control block to a state of RUNNING to indicate that the timer is active and updating a flag-chain field of said time-flag field in said timer control block to a state of CHAINED if the timer control block is inserted for the first time in the chain, and if the timer control block is already chained, then updating the flag-state field to the state of RUNNING, storing said value in said time-out value field (Tv) in said timer control block of the associated event, and updating said time-stamp field (Ts) to the current time, and in response to a STOP operation, updating said flag-state field in said time-flag field of the associated timer control block to the state of "STOP", and at each regular time interval, successively reading each timer control block chained to the storing location in said cyclic means, and checking the flag-state field of the time-flag field (Tf) and unchaining said associated timer control block if its flag-state field has the state of STOP, and otherwise, computing a new time-out value based on the current time, the time-stamp (Ts) and the value in said time-out value field (new time-out value=time-out value+time-stamp−current time) to control, if the time-out delay has elapsed, the inserting of the timer control block into a new timer control block chain if the new time-out value is positive, or unchaining and stopping the timer control block if said new time-out value is equal to zero and notifying the user that the time-out delay has elapsed.

2. The method of claim 1 further comprising the step of:

in response to a RESTART operation issued by said user when the occurrence of the associated event has to be delayed, updating the time-stamp field of the associated timer control block to the current time.

3. The method of claims 1 or 2 wherein the timer control blocks are chained to each other by a one-way link.

4. A device for controlling a plurality of timers of a number of users, each timer being associated with an event and having an associated timer control block in a data processing system having a processor and a memory wherein a user issues a START operation for a timer when an occurrence time of the associated event is awaited within a time-out period (Tv), a RESTART operation when the occurrence time of the associated event has to be delayed, and a STOP operation when the associated event has occurred, said device being characterized in that each timer control block is divided into at least a time-flag field (Tf) which includes a flag-state field set to a state of RUNNING at each START operation to indicate that the associated event is awaited or set to a state of STOP at each STOP operation to indicate that the associated event has already occurred, and a flag-chain field to indicate if the timer control block is CHAINED or UNCHAINED to a timer chain, a time-stamp field (Ts) which is set to a current time at each START operation and updated to the current time at each RESTART operation to enable the associated event to be delayed, a time-out value field (Tv), and an address field, said device comprising:

a cyclic means having a number N of storing locations in order to classify the timer control blocks for the associated events according to a value in the time-out value field and the current time, said cyclic means being managed by a timer control program stored in said memory and controlled by said processor, an addressing means which sequentially addresses each storing location of said cyclic means at regular time intervals, and a timer chain pointed to by said addressing means and comprising a plurality of timer control blocks associated with events which should occur before a time T, before said START, RESTART or STOP operations interrupt the timing of said associated events, said timer control blocks being chained to each other by storing in the address field the address of a next timer control block in the timer chain or a special code to indicate the end of the timer chain, wherein at regular time intervals, each timer control block chained to the addressed location of the cyclic means is read to unchain the timer control block if its flag-state field is set to STOP, and otherwise, to compute a new time-out value for the time-out value field based on the current time, the time-stamp Ts and the value in said time-out value field by computing new time-out value= time-out value+ time-stamp–current time, to control, if the time-out delay has elapsed, the inserting of the timer control block into a new timer chain if the new time-out value is positive, or to unchain and stop the timer control block if said new time-out value is equal to zero and to notify the user that the time-out delay has elapsed.

5. The device according to claim 4 wherein the timer control blocks are chained to each other by a one-way link.

* * * * *